United States Patent
Reyna et al.

(10) Patent No.: US 7,162,709 B2
(45) Date of Patent: *Jan. 9, 2007

(54) SYSTEM AND METHOD FOR COMMON CODE GENERATION

(75) Inventors: David Reyna, San Francisco, CA (US); Shawn-Lin Dzeng, San Francisco, CA (US)

(73) Assignee: Wind River Systems, Inc., Alameda, CA (US)

( * ) Notice: Subject to any disclaimer, the term of this patent is extended or adjusted under 35 U.S.C. 154(b) by 468 days.

This patent is subject to a terminal disclaimer.

(21) Appl. No.: 10/713,821

(22) Filed: Nov. 14, 2003

(65) Prior Publication Data

US 2004/0098402 A1    May 20, 2004

Related U.S. Application Data

(63) Continuation of application No. 09/797,114, filed on Mar. 1, 2001, now Pat. No. 6,678,885.

(60) Provisional application No. 60/186,560, filed on Mar. 2, 2000.

(51) Int. Cl.
*G06F 9/45*    (2006.01)

(52) U.S. Cl. ..................................................... 717/104
(58) Field of Classification Search ................ 717/140, 717/104

See application file for complete search history.

(56) References Cited

U.S. PATENT DOCUMENTS 6,052,527 A * 4/2000 Delcourt et al. ............ 717/138

* cited by examiner

*Primary Examiner*—John Chavis
(74) *Attorney, Agent, or Firm*—Fay Kaplun & Marcin, LLP

(57) ABSTRACT

A system and method that improve a process of creating software programs for a variety of existing computing platforms. The method includes the steps of: receiving a formatted data file having a predefined, platform independent structure, compiling a common generation file, written in a lowest common denominator language utilized by each of the plurality of computing platforms, with the data file to generate a predefined output file. The output file will be compatible with one of a plurality of computing platforms. The system generates a predefined output file utilizing a common generation file adapted to create the predefined output file that is compatible with each of a plurality of computing platforms, and a compiler for compiling the common generation file with a data file having a predefined and platform independent structure.

15 Claims, 4 Drawing Sheets

SYSTEM AND METHOD FOR COMMON CODE GENERATION

This application is a Continuation of prior U.S. patent application Ser. No. 09/797,114 filed Mar. 1, 2001 now U.S. Pat. No. 6,678,885 entitled "System and Method for Common Code Generation". The application is expressly incorporated herein, in its entirety, by reference.

This application claims the benefit of U.S. Provisional Patent Application 60/186,560 filed on Mar. 2, 2000 and entitled "Method and System for Modular Software Architecture for Peer-to-Peer Management of Network Devices" and is expressly incorporated herein, in its entirety, by reference. Additionally, the application entitled "System and Method for a Command Structure Representation" to the named inventors Lee Chang and Shawn-Lin Dzeng, filed on an even date herewith and the application entitled "System and Method for Automatic Software Code Generation" to the named inventors Lee Cheng and Shawn-Lin Dzeng, filed on an even date herewith, both of which are assigned to the Assignee of the present application, are expressly incorporated herein, in their entirety, by reference.

BACKGROUND INFORMATION

A variety of computing platforms exist in today's computing environment (e.g., UNIX, DOS, MAC, Windows 3.x, Windows 9x, Windows NT, Palm). Even more computing platforms are being developed and will be developed in the future. This wide variety of computing platforms may present problems for software developers, for example, requiring software developers to provide users with software programs compatible with the existing computing platforms.

Requiring compatibility of the software programs with multiple computing platforms often creates a number of problems for software developers. For example, developers may need to utilize programmers skilled in a variety of computing platforms. Different programmers working on the same software program may generate code that works differently on different computing platforms. It is especially hard to ensure that the code is identical to each other since the code may be written in different languages for different computing platforms.

Developing software programs compatible with several platforms may significantly increase the cost of these programs and extend the time required to bring the program to market. Also, there may be more expenses and difficulty to update such software programs.

Another problem with existing technologies is that they often utilize data files or data structures in binary format to generate output files for a variety of computing platforms. The binary format may cause problems as the processing units of different computing platforms may encode numbers in different byte orders (e.g., Motorola processors may encode numbers differently than Intel processors), requiring special flags and corresponding code to compensate for these differences. In addition, data files in binary structure form are fixed in size, requiring special fields and code to accept changes in content. Including formatting rules as part of each data file allows validation information to be contained therein in a form consistent with each specific version of the file. Otherwise, special efforts must be made to continuously update consistency checks in differing modules. Having data in an extendible format compensates for version skew in older project files and older programs. Otherwise, special efforts must be made to compensate for unexpected new fields and missing fields that have been deprecated.

Thus, there is a need for a system and method that simplifies the process of creating software programs for a variety of existing computing platforms or, for example, of developing code generation on different platforms intended for the target platform.

SUMMARY OF THE INVENTION

The present invention relates to a system and method improves a process of creating software programs for a variety of existing computing platforms. In particular, a developer receives an input file. The developer generates a formatted data file as a function of the input file. In the input file includes data, the data contained within the formatted data file is stored in a predetermined format compatible with each of a plurality of computing platforms. Then the developer generates a common generation file using a predetermined programming language which is a lowest common denominator language utilized by each of the plurality of computing platforms. The common generation file is capable of creating a predefined output file compatible with each of the plurality of computing platforms. The formatted data file is modified to create a modified formatted data file; the modification are provided via an interface of a corresponding one of the plurality of computing platforms. Finally, the common generation file is compiled with the modified data file to generate the predefined output file for the corresponding platform. Another exemplary method is where the developer provides the user with several development programs, each working in a different computer platform, with which creates the data that is then passed to the common code generation file/module internal to the program.

DETAILED DESCRIPTION

Figure 1:
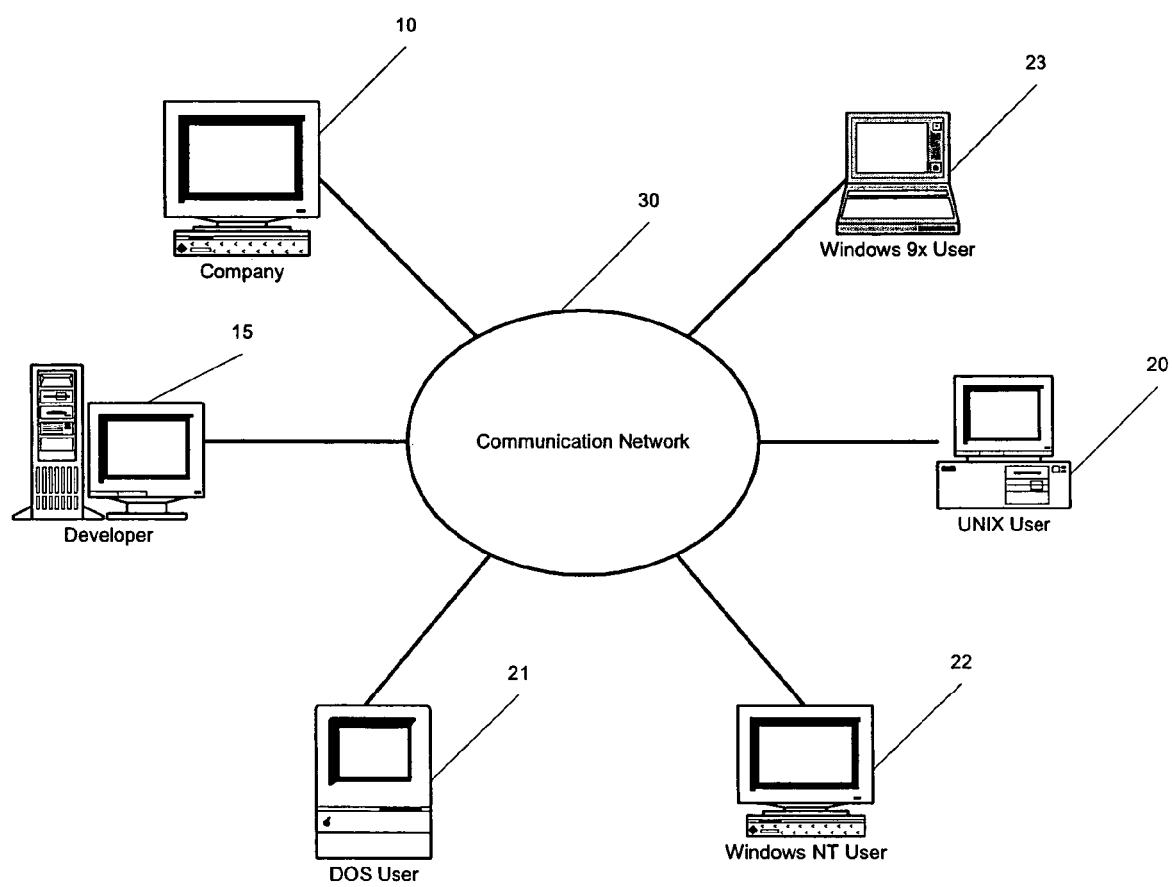
FIG. 1 shows an exemplary embodiment of a system according to the present invention.

The present invention may be further understood with reference to the following description and the appended drawings, wherein like elements are provided with the same reference numerals. Throughout this specification, the exemplary embodiments of the present invention will be discussed with reference to embedded devices and the accompanying operating systems. However, those skilled in the art will understand that the present invention is not limited to embedded systems, and may be used with any computing system. Additionally, the term developer is generally used throughout this description to describe the individual responsible for developing the operating system (e.g., adding new commands, editing existing commands, etc.) The term user is generally used to describe the individual that may be using the operating system. However, the terms may be used interchangeably throughout this description. For example, the term user may also describe the individual responsible for developing the operating system.

FIG. 1 depicts a company 10 which sells and/or makes available a software application to users 20, 21, 22 and 23. As part of this software application, the company 10 may need to provide certain data regarding different resources for use therewith. These resources may be a plurality of objects, tables, etc. For example, the company 10 may want to provide to users 20–23 a tree description of a particular product, a Simple Network Managed Protocol ("SNMP") table and a managed object abstract representation of the users' objects (e.g., anything that may need to be visible to the outside world).

The users 20–23 may be utilizing different platforms. For example, user 20 may be using a UNIX platform, user 21 may be utilizing a DOS platform, while users 22 and 23 may be utilizing Windows NT and Windows 9x platforms, respectively. These computing platforms have different input/output interfaces, e.g., UNIX and DOS may have console interfaces, while the Windows NT and Windows 9x platforms may have graphical user interfaces ("GUIs").

The company 10 requests a developer 15 to develop a software application which has input/output interfaces compatible with the various users' platforms. The method and system according to the present invention allows an improvement in this process. In particular, according to the present invention, code generation is separated as a specialized function by creating a single module that can be used by a variety of development tools for a plurality of computing platforms which have different levels of user interfaces (e.g., the GUI, a command line console interface, etc.). As described below, this is achieved by (1) isolating code generation routines into language modules that are in a lowest common compatible language (e.g., language "C"); (2) defining a common system-independent data format to represent and convey the data from any parent program to the code generation module; and (3) compiling the code generation module into each program, insuring that output results are identical.

Figure 2:
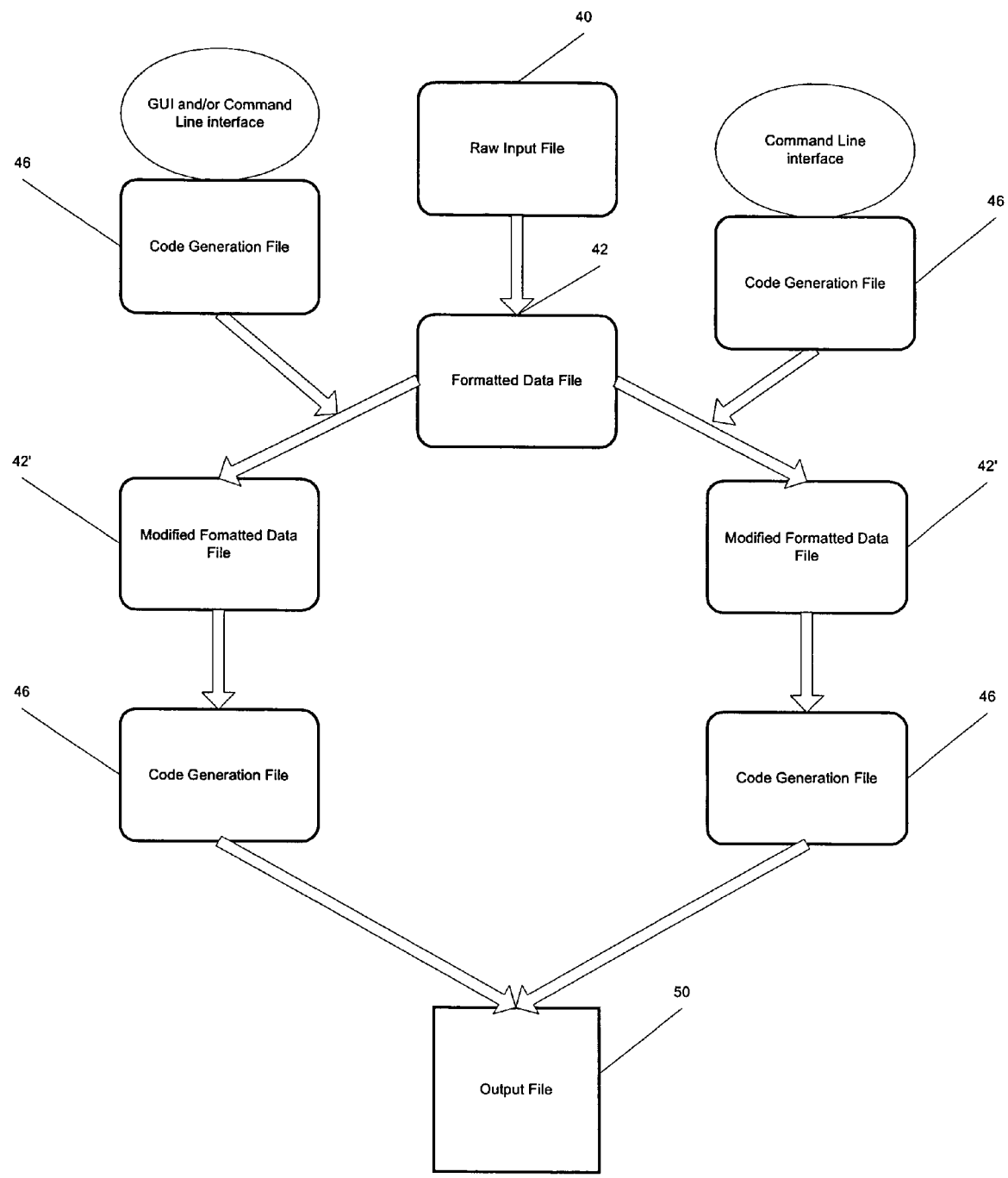
FIG. 2 shows a schematic diagram of a code-generation process.
Figure 3:
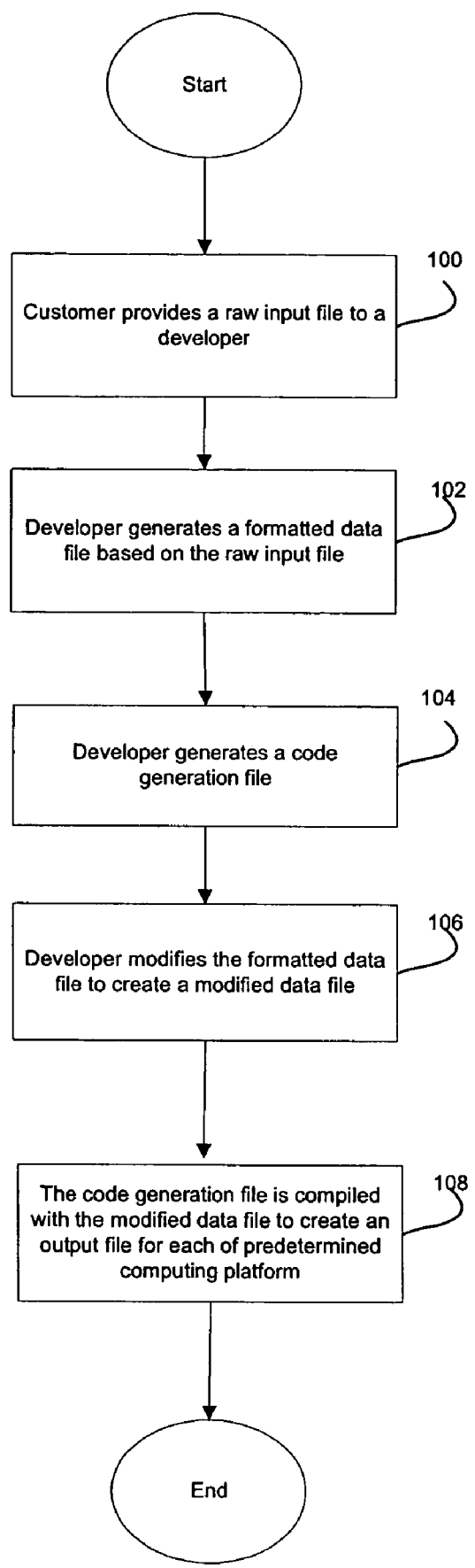
FIG. 3 shows an exemplary method according to the present invention.

FIGS. 2 and 3 show the method according to the present invention. In step 100, the company 10 provides a raw input file 40 to the developer 15. The raw input file 40 may include any type of data, for example, data regarding attributes of the resources which are going to be provided to users 20–23. In alternative exemplary embodiment of the present invention, the raw input file 40 may be a blank file containing no data. In this case, the data is built up in a progressive manner.

The developer 15 generates a formatted data file 42 based on the raw data file 40 (step 102). The formatted data file 42 has a predetermined format which is common (i.e., cross computing platform compatible) to any of the users' platforms. Such platform-independent format may be, for example, an XML file, an ASCII file, a binary file, etc. The formatted data file 42 has a predetermined structure to store the data. In other words, the data may be structured so that new data fields can be added and old ones removed, and yet the data as a whole is still readable by older programs from any computing platform. The formatted data file 42 is structured such that rules for formatting the data are included or implied so that the data can be validated (e.g., XML). If the raw input file 40 is a blank file, then the formatted data file 42 has no data, but may include information about its data structure.

In step 104, shown in FIG. 3, the developer 15 writes a code generation file 46. The code generation file 46 may be written using a lowest common denominator language which can be utilized by the computing platforms with which the software application is to operate. One way to choose such a language is to examine each of the computing platforms involved and determine a language that may be understood by all of these computing platforms. For example, languages such as PASCAL and C may be understood by a variety of existing computing platforms. Thus, these languages may serve as the lowest common denominator languages for many applications. This lowest common denominator language also should be able to process files without necessarily displaying any messages to the user. In addition, this language should be compatible with other programs of the computing platforms.

The code generation file 46 is programmed to generate a file accessible by each of the computing platforms. As an input, the code generation file 46 accepts data saved in a structured form. For example, the code generation file 46 may accept the name of the modified data file 42', its structure and a desired type of computing platform. The creation of modified data file 42' is described in greater details below. Furthermore, the code generation file 46 may read/write data from the formatted data file 42. Any modification to the data may be saved into the formatted data file 42 by the code generation file 46. One of the advantages of utilizing the code generation file 46 is that it ensures that any modifications to the data are preserved in its formatted structure.

In an alterative exemplary embodiment of the present invention, interpretation languages (such as TCL and BASIC) or platform-independent languages (such as Java) may be used instead of the lowest common denominator languages (such as PASCAL and C), in which the common code generation file/module may be written.

Figure 4:
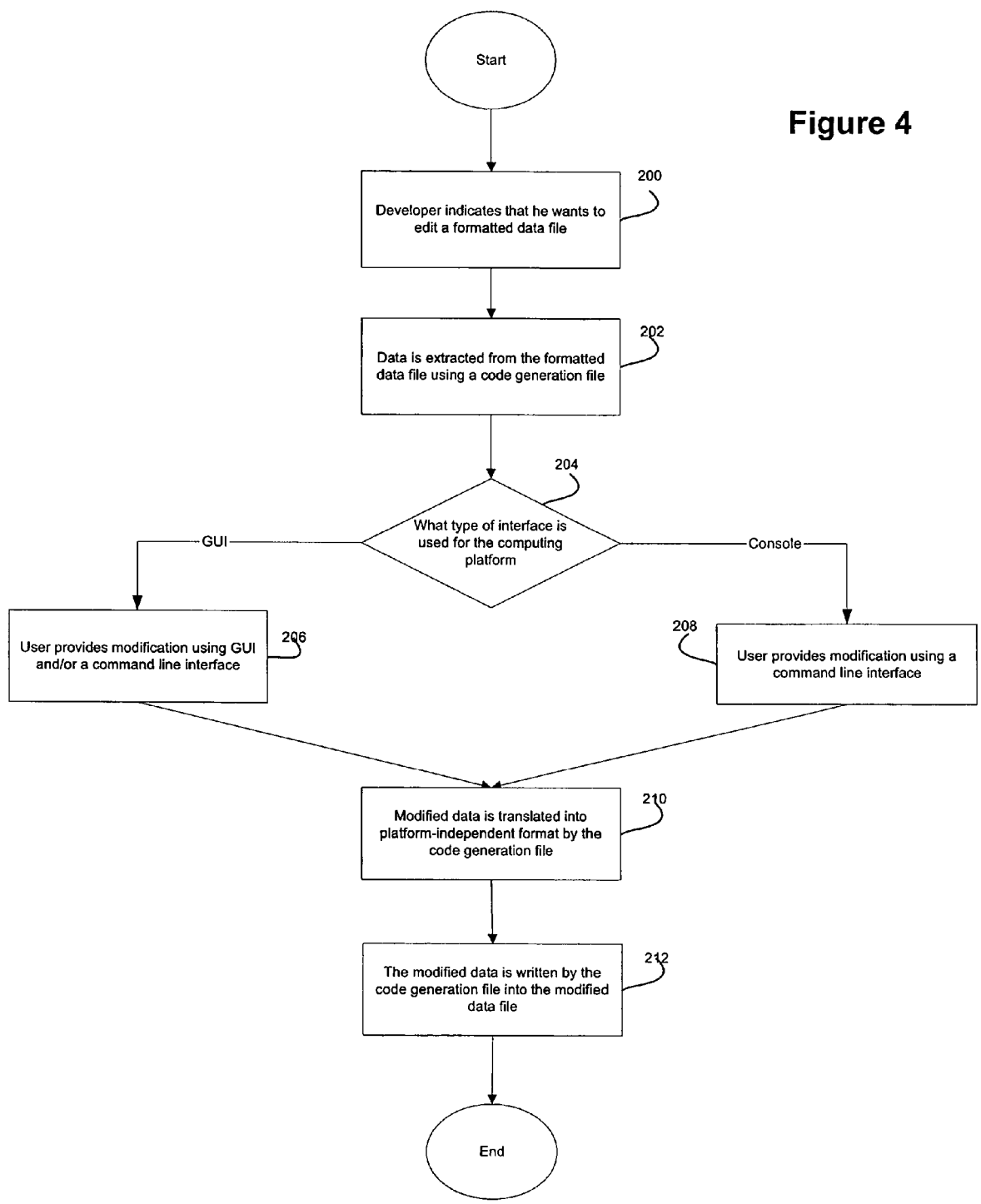
FIG. 4 shows an exemplary embodiment of a modification step of the method illustrated in FIG. 3.

In step 106, the developer 15 modifies the formatted data file 42 to create a modified data file 42'. The modifications may be done in a variety of ways depending on the computing platform that is being used. An exemplary modification of the formatted data file 42 is described below and is shown in FIG. 4.

First, the developer 15 indicates his intention to modify the data stored in the formatted data file 42 (step 200). Then the data is extracted from the formatted data file 42 according to the predetermined data structure by the code generation file 46 (step 202). Depending on the computing platform being utilized, the developer 15 may modify the data (step 204). If the developer 15 utilizes a computing platform such as Windows NT, the developer 15 may modify the data via the GUI and/or a command line (step 206). If on the other hand, the user is utilizing a platform such as DOS, the user may modify the data using the console by entering modifications via a command line only (step 208).

The modifications are received and processed by the code generation file 46. In particular, the modifying data is translated into the same platform-independent format (step 210). Subsequently, the code generation file 46 saves the data into the modified formatted data file 42' in accordance with the predetermined data structure (step 212).

In step 108, the code generation file 46 is compiled with the modified formatted data file 42' to generate a predefined output file 50. The predefined output file 50 may be accessible using the corresponding computing platform. For example, the output file 50 may be accessed using GUIs if it was created for the Windows 9x platform. The output files 50 for different computing platforms may be created parallel and simultaneously.

One of the advantages of the present invention is that the code generation file 46 needs to be prepared only once by a single developer and it is capable of generating an output file 50 for any desired computing platform. In other words, the present invention allows a developer to maintain the code generation function 46 as a separate module thus insuring that each version of the output data file for each of the computing platforms is identical.

Furthermore, a single change of the modified formatted data file 42' may change the output file 50 for each of the desired computing platforms. Thus, the need to individually create an output file 50 for each computing platform is eliminated. The present invention also allows an automatically coordinative generation for output files for different computing platforms.

As described below, the present invention may be utilized where there are two different computing platforms A and B. In particular, a computing platform A may utilize the GUI interface W and a command line interface X for code generation development, while computing system B, utilizes a proprietary GUI interface Y and a proprietary command line interface Z for code development.

In conventional systems, the developer would need to prepare four files—one of which is compatible with a respective one of interfaces W, X, Y and Z. However, the present invention allows a developer to utilize the same data file to generate a formatted data file which can be edited via the interfaces W, X, Y and Z. Since each of the four interfaces may utilize the same identical code generation file to generate an output data file which is identified for both computing platforms A and B. Thus, the present invention allows the use of a common formatted data file and code generation file to produce an identical output data file regardless of the type of computing platform or user interface employed by these computing platforms.

Those skilled in the art will understand that these techniques may be used for variety of computer hardware platforms. For example, the present invention may be utilized to generate code for chips manufactured by different hardware manufacturers.

There are many modifications to the present invention which will be apparent to those skilled in the art without departing form the teaching of the present invention. The embodiments disclosed herein are for illustrative purposes only and are not intended to describe the bounds of the present invention which is to be limited only by the scope of the claims appended hereto.

What is claimed is:

1. A system, comprising:
   a common generation file adapted to create a predefined output file compatible with each of a plurality of computing platforms; and
   a compiler configured to compile the common generation file with a data file to generate the predefined output file, wherein the data file has a predefined structure which is platform independent.

2. The system according to claim 1, wherein the common generation file is written in a lowest common denominator language utilized by each of the plurality of computing platforms.

3. The system according to claim 1, wherein the common generation file is further adapted to accept as input a name of the data file, the predefined structure of the data file and a type of one of the plurality of computing platforms.

4. The system according to claim 1, wherein the data file is a modified data file.

5. The system according to claim 4, wherein the common generation file is further adapted to:
   extract data stored in an original data file according to the predefined structure;
   process modifications to the data; and
   save the modified data into the modified data file according to the predefined structure.

6. The system according to claim 1, wherein the plurality of computing platforms includes one of UNIX, DOS, MAC, Windows 3.x, Windows 9x, Windows NT and Palm.

7. The system according to claim 2, wherein the lowest common denominator language is one of Pascal, C, C++, TCL, BASIC and Java.

8. A method, comprising the steps of:
   receiving a formatted data file, the data file having a predefined structure which is platform independent;
   compiling a common generation file with the data file to generate a predefined output file which is compatible with one of a plurality of computing platforms, wherein the common generation file is written in a lowest common denominator language utilized by each of the plurality of computing platforms.

9. A method according to claim 8, further comprising the steps of:
   extracting data stored in the formatted original data file according to the predefined structure;
   processing modifications to the data;
   saving the modified data into a modified data file according to the predefined structure; and
   performing the compiling step with the common generation file and the modified data file.

10. The method according to claim 9, wherein the modifications to the data include one of adding a new data field and deleting an existing data field.

11. The method according to claim 8, wherein the formatted data file is created as a function of an unformatted input file.

12. The method according to claim 8, wherein the predefined structure is one of XML, ASCII and binary.

13. The method according to claim 8, further comprising the step of:
   receiving an input of a type of the one of the plurality of computing platforms, wherein the predefined output file is compatible with the one of a plurality of computing platforms.

14. A computer-readable storage medium storing a set of instructions, the set of instructions capable of being executed by a processor, the set of instructions performing the steps of:
   receiving a formatted data file, the data file having a predefined structure which is platform independent;
   compiling a common generation file with the data file to generate a predefined output file which is compatible with one of a plurality of computing platforms, wherein the common generation file is written in a lowest common denominator language utilized by each of the plurality of computing platforms.

15. The set of instructions according to claim 14, further performing the steps of:
   extracting data stored in the formatted original data file according to the predefined structure;
   processing modifications to the data;
   saving the modified data into a modified data file according to the predefined structure; and
   performing the compiling step with the common generation file and the modified data file.

* * * * *